March 12, 1935. J. S. BURDICK 1,994,449
REEL CLAMPING HANDLE FOR FISHING RODS
Filed June 29, 1934
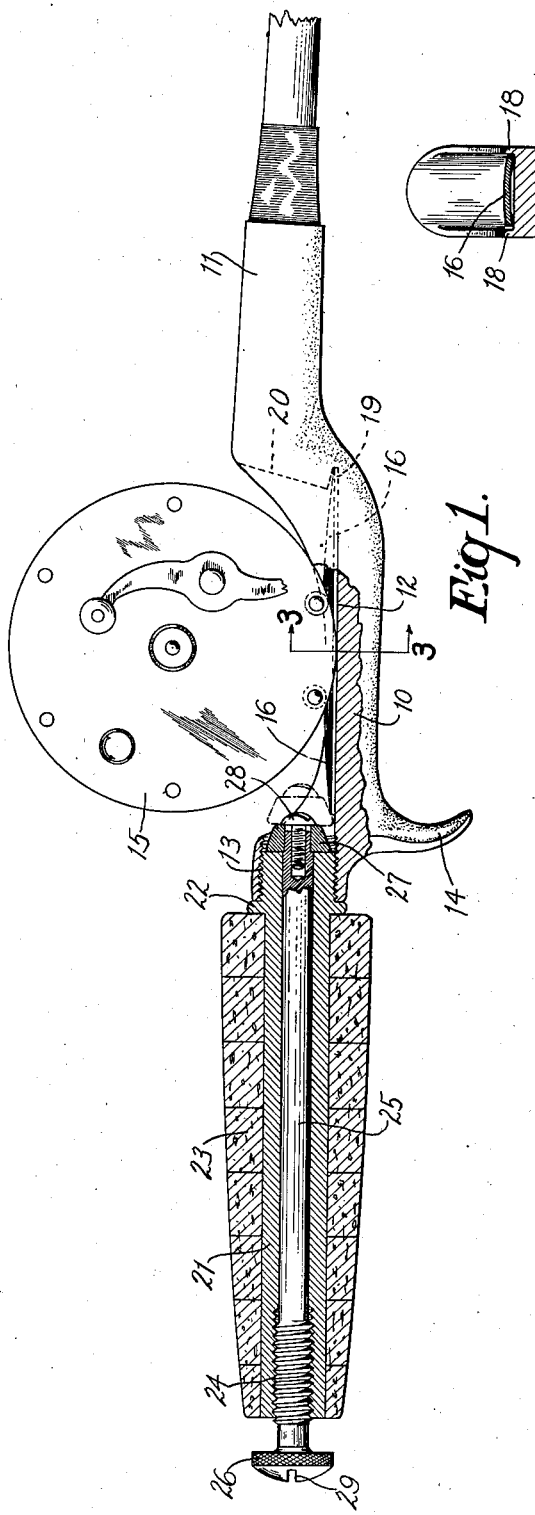
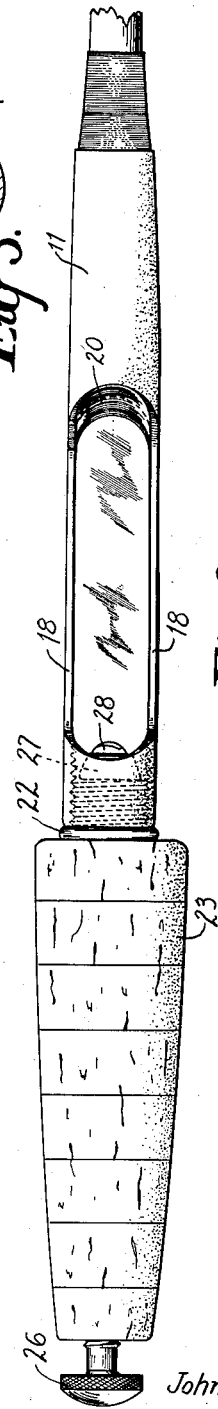
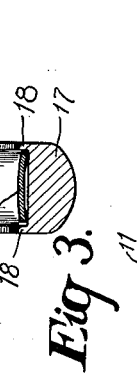
INVENTOR.
John S. Burdick.
BY Slough and Canfield
ATTORNEY.

Patented Mar. 12, 1935

1,994,449

UNITED STATES PATENT OFFICE 1,994,449

REEL CLAMPING HANDLE FOR FISHING RODS

John S. Burdick, Buffalo, N. Y., assignor to The American Fork & Hoe Company, Cleveland, Ohio, a corporation of Ohio Application June 29, 1934, Serial No. 733,084

9 Claims. (Cl. 43—22)

This invention relates to fishing rods, and relates more particularly to an improved and novel means for detachably mounting the reel thereon.

Prior fishing rod handles of this type with which I am familiar have had the clamping means operable within or closely adjacent the reel receiving portion of the handle rendering it difficult due to the limited space for actuating the clamp means to secure the reel to or remove it from the handle. I provide a handle having a relatively unobstructed reel receiving portion and clamp means operable at the rear extremity of the handle.

It is a primary object of my invention, therefore, to provide in a fishing rod an improved reel clamping handle whereby the reel may be easily detachably secured thereto.

Another object of my invention is to provide an improved reel clamping handle for fishing rods which is of rugged construction although relatively light and which can be economically manufactured.

Another object of my invention is to provide an improved reel clamping handle for fishing rods provided with reel clamping means which is readily accessible and which may be easily and positively manipulated.

These and other objects of the invention will become increasingly apparent from a consideration of the following description and drawing, wherein:—

Fig. 1 is an elevational view partially in medial section of a fishing rod handle embodying my invention, showing a reel secured thereto;

Fig. 2 is a plan view of the handle illustrated in Fig. 1, with the reel removed; and Fig. 3 is a transverse sectional view taken along line 3—3 of Fig. 1.

Referring now to the drawing, I have shown at 10 a reel support preferably formed of relatively light cast metal such as aluminum and comprising a socket 11 adapted to receive and non-rotatably secure therein the innermost end of a fishing rod, a depressed elongated reel seat 12, and a rearwardly disposed internally threaded collar 13 longitudinally aligned with socket 12. The rearward portion of the reel support 10 is preferably provided with a depending hooked finger grip 14 whereby the rod may be more accurately controlled.

The reel seat 12 is preferably channel shaped in cross-section, as indicated in Fig. 3, the upstanding lateral edges thereof 18—18 flaring upwardly from the reel seat 17 to merge at the forward end with the socket 11 and at the rear end of the reel seat with the collar 13.

A conventional reel 15 is provided with a reel base 16, generally rectangular, and preferably arched upwardly axially thereof, as indicated in Fig. 3. The forward end of the reel base is adapted to be received within a pocket 19 formed by undercutting the front wall 20 of the reel seat. The top face of the pocket 19 is preferably inclined upwardly and outwardly so that the forward end of the reel base may be easily inserted therein. The front face 20 of the reel seat is preferably inclined upwardly and forwardly, as indicated in Fig. 1, to provide ample clearance for the peripheral portion of the reel 15 when inserting or removing the same from the reel seat.

The manner of clamping the reel base and maintaining the same on the reel seat will now be explained.

A tubular shank 21 is provided with a collar 22 and the portion of the shank forwardly of collar 22 is externally threaded whereby the shank may threadedly engage collar 13 and be detachably secured thereto, collar 22 abutting the rear face of collar 13 and frictionally maintaining shank 21 in engagement with the reel support 10.

A cork or the like handle 23 encases shank 21 rearwardly of collar 22, being secured thereon in a well known manner.

Although I have shown handle 23 as being rearwardly tapering, it is understood that a handle of any suitable contour may be used.

The rear portion of shank 21 is internally threaded as indicated at 24 to threadedly engage a rod 25 projected through the bore thereof, the rear end of rod 25 terminating in a preferably knurled head 26 whereby the rod may be easily manipulated to move it longitudinally of shank 21. The forward end of rod 25 is of slightly reduced diameter to form a seat for a generally frusto-conical clamp member 27 rotatably secured thereon by means of screw 28.

It will now be understood that reel 15 may be secured to reel seat 10 by projecting the forward portion of the reel base 16 within the pocket 19 and clamping the rear portion of the reel base by moving the clamp member 27 forwardly to engage the upper rear face of the reel base through manipulation of the knurled head 26, the reel being shown in clamped position in Fig. 1. In order to more easily secure or release the clamp member 27 from contact with the reel base, I provide a slot 29 in head 26 whereby a screwdriver or the like may be inserted to rotate rod 25.

Although I have shown and described a preferred embodiment of my invention, I contemplate that numerous and extensive departures may be made therefrom without departing from the spirit of the invention and the scope of the appended claims.

Having thus described my invention, what I claim is:—

1. A fishing rod handle comprising a reel support having a rod receiving socket at its forward end and a tubular hand grip at its rear end, said reel support providing a reel seat, and reel clamping means operable from the rear exterior of the hand grip and projected through the bore thereof comprising a portion disposed forwardly of the hand grip adapted to detachably and wedgingly force the base of a reel against said reel seat, and a manual gripping portion projecting rearwardly of the hand grip for effecting movement of the clamping portion.

2. A reel supporting handle provided with a rearwardly extending tubular hand grip element and clamping means to removably secured the base of a reel on the handle forwardly of the hand grip comprising a rotatable rod projected through the bore of said hand grip, said rod comprising in its forward end a clamp portion adapted to force a reel base against the reel seat and the rearward portion of the rod projecting from the rear of the hand grip element to provide a manual gripping means effecting rod movement.

3. A reel supporting handle provided with a rearwardly extending tubular hand grip element and clamping means to removably secure the base of a reel on the handle forwardly of the hand grip comprising a rotatable rod projected through the bore of said hand grip, and a rotatable reel base engaging element mounted on the forward end of the rod adapted to exert force against the reel base, and the rearward portion of the rod extending rearwardly of the hand grip element whereby the rod may be manually gripped and rotated.

4. A reel supporting handle provided with a rearwardly extending tubular hand grip element and clamping means to removably secure the base of a reel on the handle forwardly of the hand grip comprising a rotatable rod projected through the bore of said hand grip, and threadedly engaging the same, whereby the rod may be moved longitudinally of the hand grip by a manual gripping portion extending rearwardly of the hand grip element, to effect engagement of the forward end thereof with a reel base and direct downward and axial forward pressure on the reel base.

5. A finishing rod handle comprising a reel support having a rod receiving socket at its forward end and a tubular hand grip at its rear end, said reel support providing an offset channel reel seat, and reel clamping means manually engageable from the rear exterior of the hand grip and projected through the bore thereof to detachably clamp the base of a reel upon said reel seat by a forward portion of the rod disposed forwardly of the hand grip.

6. A fishing rod handle comprising a reel support having a rod receiving socket at its forward end and a tubular hand grip at its rear end, said socket and hand grip being longitudinally aligned, the reel support providing a reel seat having upstanding lateral walls, and reel clamping means operable from the rear exterior of the hand grip and projected through the bore thereof to detachably clamp the base of a reel upon said reel seat comprising a rod extending forwardly of the hand grip and including a rotatable generally frusto-conical reel base engaging element.

7. A fishing rod handle comprising a reel support having a rod receiving socket at its forward end and a tubular hand grip at its rear end, said reel support providing a depressed reel seat, the hand grip threadedly engaging and frictionally abutting the reel support, and reel clamping means operable from the rear exterior of the hand grip comprising a rod projected through the bore thereof and threadedly engaging the same having a forwardly tapering clamp member rotatably mounted on the forward end of the rod.

8. A fishing rod handle comprising a reel support having a rod receiving socket at its forward end, a threaded collar at its rear end and an intermediate depressed generally channel shaped reel seat, a tubular hand grip disposed rearwardly of the reel support and threadedly engaging said collar, and reel clamping means operable from the rear exterior of the hand grip comprising a rod projected through the bore thereof and threadedly engaging the same, and provided with a generally frusto-conical reel base engaging member rotatably mounted on the forward end of the rod.

9. A fishing rod handle comprising a reel support having a tubular hand grip at its rearward end and a forwardly disposed offset reel seat, and reel clamping means comprising a rod projecting through the hand grip bore extending rearwardly and forwardly therefrom, the rear end of the rod being enlarged to form a manual gripping means and the forward end of the rod being provided with a relatively enlarged reel base engaging portion.

JOHN S. BURDICK.